R. W. George,
Washing Machine,

Nº 31,882.  Patented Apr. 2, 1861.

Witnesses.

Inventor
R. W. George

UNITED STATES PATENT OFFICE.

ROBERT W. GEORGE, OF RICHMOND, MAINE.

WASHING-MACHINE.

Specification of Letters Patent No. 31,882, dated April 2, 1861.

*To all whom it may concern:*

Be it known that I, ROBERT W. GEORGE, of Richmond, in the county of Sagadahoc and State of Maine, have invented an Improved Washing-Machine, and do hereby declare the same to be fully described in the following specification and illustrated in the accompanying drawings, of which—

Figure 1:
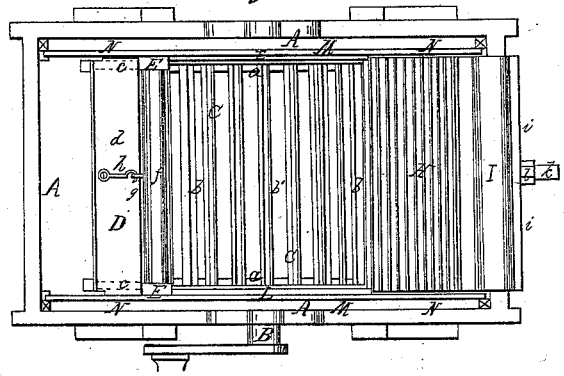
Figure 2:
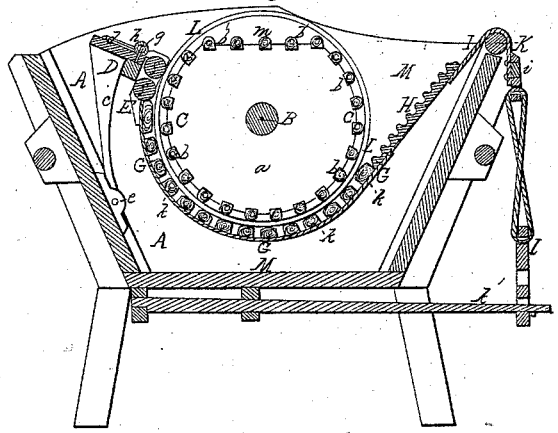
Figure 3:
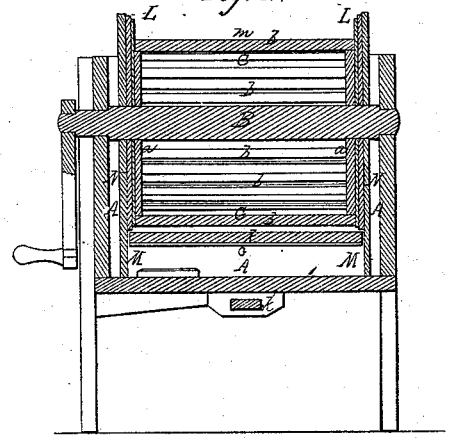

Figure 1, is a top view; Fig. 2, a longitudinal section, and Fig. 3, a transverse section of the said machine.

In the drawings, A exhibits the tub or reservoir for holding the clothes and washing fluid. A shaft B extends through the tub and supports a rotary dasher or disk wheel C, which is constructed of two heads or disks *a, a*, and a series of slats *b, b, b*, connecting them at their periphery, the dasher being concentric and revoluble with the shaft.

In rear of the dasher and within the tub A there is a vibratory frame D, formed of two arms *c, c*, and a cross bar *d*, the latter connecting the said arms at their upper ends. Each of the arms, near its lower end, turns on a fulcrum *e*, and so as to enable the whole frame D to be moved on its fulcra toward and away from the dasher. To the said frame D another frame E on which are placed two or more rollers *f, f*, is affixed by a staple *g* and a hook *h*. The frames D, E, and their rollers may be termed the vibratory presser.

A long apron or strip of canvas G, has one end attached to the lower part of the frame E, and extends underneath the dasher wheel and thence upward and is affixed at its other end to the lower edge of a fluted wash board H, which is arranged in the tub A, and with reference to the dasher as shown in the drawings. Another strip of canvas I, is affixed to the upper edge of the board H, and after passing partially around the guide roller K is fastened to a bar *o*, which at its middle is attached to a spring *k* by a string or strap *l*, the whole being arranged as shown in the drawings. Between the frame E and the board H, the apron G is provided with a series of slats or bars *k, k, k*, which are extended across its upper surface and parallel to each other. Furthermore, I make a part of the outer surface of the dasher wheel flat, or in a plane as shown at *m* in Fig. 2, in which case, the dasher will not be truly cylindrical but will be in the form of a segment of a cylinder larger than a semicylinder, as the dasher is formed with some of its slats, viz., those marked *b', b'*, arranged in a plane cutting the heads in chords of short arcs. This flattened part of the outer operative surface of the dasher while in action on the clothes which are being washed in the machine not only prevents them from being rolled on the yielding slatted apron, but is of service in effecting the discharge of the clothes or their movement up to the presser.

Two circular or sectoral disks or guards L, L, are placed respectively against and outside of the two heads of the dasher, each disk or sectoral guard having a radius somewhat larger than that of its dasher head. It is against the curved periphery of these guards or disks that the slats of the apron G bear the guards serving to keep them from direct contact with the slats of the dasher. The guards are to be stationary while the dasher may be in revolution. Furthermore, between each guard and the next adjacent side of the tub A, there is a yielding side board or thin partition M, which extends from end to end of the tub, and so as to leave a narrow space N between such partition and the next adjacent side of the tub. The edges of the apron G or the ends of its slats, as well as the ends of the washboard work closely against the yielding partitions. These partitions should be made of thin boards or stuff which will easily yield to any lateral expansion of the apron, or when any expansive matters or clothes or portions of clothes may get between either of the said partitions and the adjacent edge of the apron or that of the washboard.

The object of the yielding partitions is to enable the apron and wash-board to move freely without being bound, either by expansion against the sides of the tub or by means of the clothes or portions thereof getting between the apron or wash-board and the adjacent side of the tub. If necessary, the yielding partitions may have holes made through them for the free circulation of the water through such partitions.

When clothes are placed between the washboard and the dasher, and the latter is rotated with rapid, reciprocating, rotary, movements, the said clothes will be borne against the dasher by means of the yielding apron and its wash-board and provided the tub be properly supplied with a washing liquid such clothes may be cleansed thereby by the conjoint action of the dasher, the vibratory presser, the yielding apron and the wash board.

The frame D, of the vibratory frame enables the clothes after having been sufficiently washed to be thrown out or discharged from the machine, as such presser will give way while the clothes may be in the act of being moved out of the rear of the machine by the dasher.

For washing clothes or other fabrics, my machine will operate to excellent advantage, and is not likely to tear or injure them.

I claim—

My improved washing machine consisting of a vibratory presser frame D, rotary dasher C, (made with a flat $m$,) yielding slatted apron G, sectoral guards L, L, and yielding partitions or side boards M, M, combined and arranged substantially in manner and so as to operate as specified.

ROBERT W. GEORGE.

Witnesses:
R. H. EDDY,
F. P. HALE, Jr.